May 24, 1949.  D. Y. RICE  2,471,285
VALVE
Filed Nov. 8, 1944  2 Sheets-Sheet 2
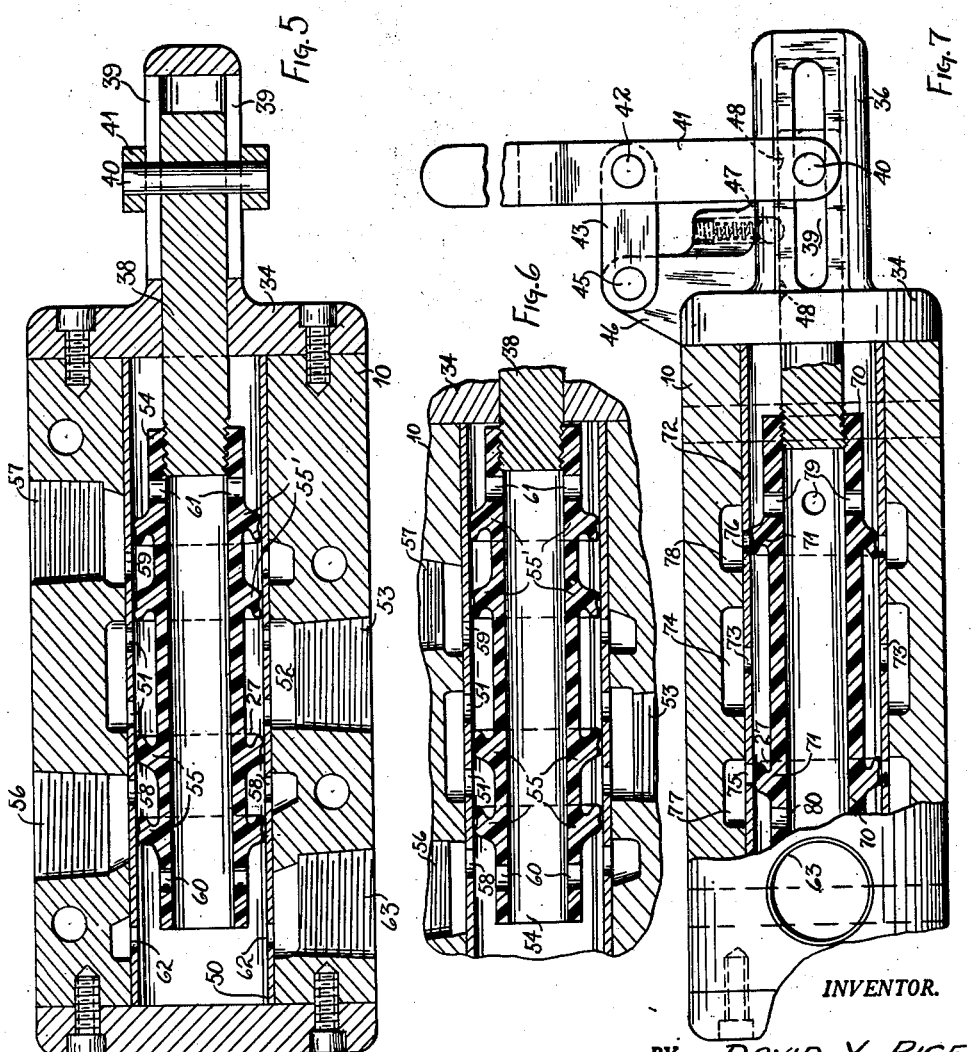
INVENTOR.
BY DAVID Y. RICE
Kwis Hudson, Boughton & Williams
ATTORNEYS Patented May 24, 1949

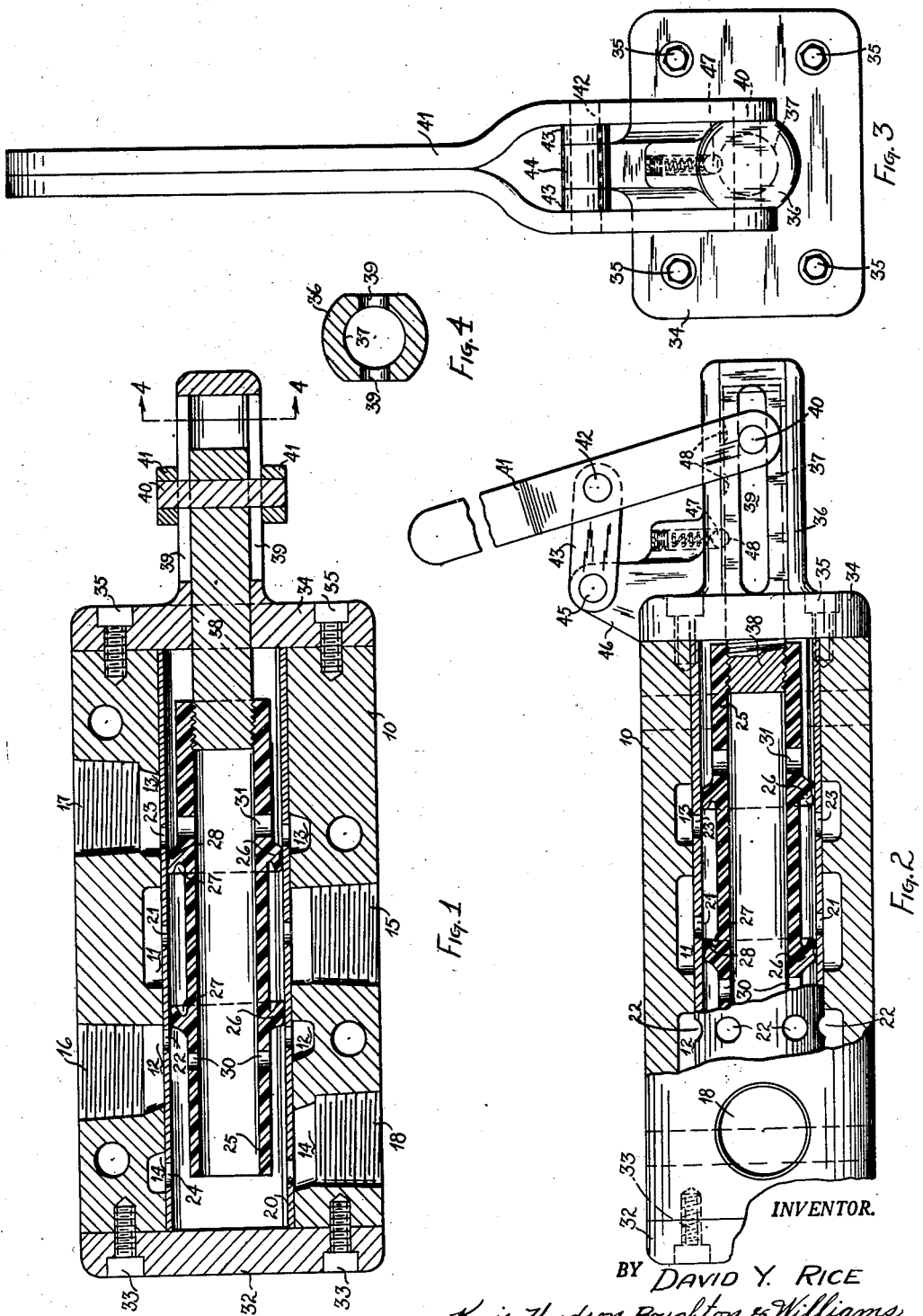

2,471,285

UNITED STATES PATENT OFFICE 2,471,285

VALVE

David Y. Rice, Avon Lake, Ohio

Application November 8, 1944, Serial No. 562,451

5 Claims. (Cl. 251—78)

This invention relates to improvements in valves, more particularly piston valves. In the embodiment illustrated it is applied to piston valves for controlling the direction of flow of live fluid and exhaust fluid toward and from a hydraulic or pneumatic power cylinder.

One of the objects of the invention is the provision of a valve of the character stated in which the plunger is constructed of a single piece of material incorporating peripheral ribs or flanges which bear resiliently on the cylinder wall.

Another object is the provision of a plunger for the purpose stated which may be molded of plastic material or machined from a plastic tube, and requiring no packings or the like to hold pressure fluid.

A further object is the provision of novel operating means for eliminating side thrust.

Still another object is the provision of a valve wherein certain parts are made interchangeable with other parts for similar purposes in order to secure different operative results by such substitution of parts.

Other objects and features of novelty will appear as I proceed with the description of those embodiments of the invention which, for the purposes of the present application I have illustrated in the accompanying drawings, in which Fig. 1 is a longitudinal central sectional view of a valve embodying the invention.

Fig. 2 is an elevational view, partly in section, on a plane at right angles to that of Fig. 1, showing the plunger in a different operative position.

Fig. 3 is an end view illustrating particularly the operating means.

Fig. 4 is a detail sectional view taken substantially on the line 4—4 of Fig. 1.

Fig. 5 is a view similar to Fig. 1, wherein a liner sleeve and a plunger of different form are employed.

Fig. 6 is a fragmental sectional view of the same with the plunger in a different operative position, and Fig. 7 is a view largely in longitudinal section corresponding to that of Fig. 2 but showing a plunger of somewhat different construction.

In all forms of the invention herein disclosed there is a valve body 10 preferably made as a casting, having annular cavities 11, 12, 13 and 14. Cavity 11 communicates with a threaded opening 15 for connection with a conductor for incoming pressure fluid. Cavities 12 and 13 communicate with threaded openings 16 and 17 respectively for connection with conductors leading to the opposite ends of a power cylinder, not shown.

Cavity 14 communicates with a threaded opening 18 for connection with a conductor for carrying exhaust fluid back to a tank or reservoir, not shown, from which it may be pumped again through the opening 15 into the cavity 11. When the valve is used for compressed air, the opening 18 merely goes to atmosphere. The function of the valve, as will be understood by those skilled in the art, is to direct live fluid from cavity 11 to either one of the two cavities 12 and 13, while at the same time connecting the remaining cavity 13 or 12 with the exhaust cavity 14.

Referring now particularly to Figs. 1 to 4 inclusive, the cylindrical interior of the casting is machined to receive a metal lining sleeve 20 preferably formed from a length of steel tubing, which fits snugly within the casting, thereby converting cavities 11, 12, 13 and 14 into annular passages. Each of these passages communicates with the interior of the sleeve through a series of circumferentially spaced ports, the ports of the different series being marked 21, 22, 23 and 24.

A tubular plunger 25 is slidably mounted within sleeve 20. It is formed of a plastic material, being preferably machined from a length of tubing of phenol-formaldehyde plastic in which a suitable fabric, paper, or other filler material, is incorporated. In the machining operation two peripheral ribs or flanges 26 are left upon the tube, so spaced apart as to stand between the ports 22 and 23 when the plunger is centered in the cylinder. These ribs are undercut at 27 on their sides disposed toward the live fluid inlet ports 21, and may be provided with shallow grooves 28 on their peripheries. They have a sufficiently snug fit with the sleeve 20 to provide substantially liquid or air tight joints, this effect being assisted by the pressure of liquid or air against the walls of the undercuts 27 tending to force the more or less resilient ribs outwardly against the sleeve. On the remote sides of the ribs 26, the plunger has ports or perforations 30 and 31 for connecting the annular spaces at the ends of the cylinder with the bore of the plunger.

One end of the cylinder is closed by a plate 32 which may be secured to the body 10 by any suitable means, as by socket head screws 33. The opposite end of the cylinder is closed by a plate 34 which is attached to the body by screws 35 or equivalent means. This plate carries an elongated projection 36 that has a central bore 37 in which is slidably mounted a rod 38. The projection 36 therefore constitutes a guide for the rod which, at its inner end, is threaded into the adjacent end of the plunger 25. The sides of the guide 36 are flattened, as indicated in Fig. 4, and are provided with opposed longitudinal slots 39. A transverse pin 40 is mounted within a transverse bore in the rod 38 and extends through the two slots 39, by which it is guided. On the extremities of this rod there are pivoted the bifurcations of a bifurcated operating lever 41 which is fulcrumed on a pivot 42 that is mounted in perforations in a pair of short links 43 with a spacer 44 therebetween. These links 43 swing on a pivot 45 which is mounted in a standard 46 integral with the plate 34 and its extension 36. Obviously, when the lever 41 is swung upon its fulcrum 42, the rod 38 is caused to slide in its guide 36, the pin 40 running in the slots 39 and thus taking any side thrust which might otherwise be imposed upon the rod. Hence there is imparted to the rod 38 only longitudinal force, and there is no tendency to cock the plunger 25 one way or other as it is moved back and forth in the cylinder. The plunger has three operative positions, and a spring-pressed ball detent 47 engaging in shallow notches 48 serves to yieldably hold the plunger in any one of these positions and to indicate to the operator by the sense of feel when any position has been reached.

When the plunger 25 occupies its central position, as illustrated in Fig. 1, live fluid is free to enter the connection 15 and the annular cavity 11 and to flow through ports 21 into the annular space between ribs 26, but it cannot leave the valve. In this position the connections 16 and 17 leading to the ends of the hydraulic or pneumatic power cylinder convey exhaust fluid from both ends of that cylinder to the annular cavities 12 and 13 and thence through the ports 22 and 23 to the annular spaces at the ends of the valve. Exhaust fluid flowing through ports 23 enters the bore of the plunger through ports 31 and flows therein along the bore to the open end thereof and thence through ports 24 into annular cavity 14 and out through connection 18 to the storage tank or to atmosphere, as the case may be. Exhaust fluid entering through connection 16, cavity 12 and ports 22 also finds its exit through port 24, annular cavity 14 and connection 18. This condition of the control valve leaves the piston of the hydraulic or pneumatic power cylinder free to move easily, and it may be shifted by hand in either direction to whatever extent may be desirable. On this account the valve is known as a compound exhaust valve.

When it is desired to move the piston of the power cylinder in a given direction the plunger 25 is shifted by the operating lever 41 to the position shown in Fig. 2. Now the ports 21 and 23 through sleeve 20 are interconnected by the annular space between ribs 26, as a consequence of which live fluid is free to flow from annular cavity 11 to annular cavity 13 and thence through connection 17 to one end of the power cylinder. The path of flow from the annular cavity 12 to the exhaust connection 18 is not interfered with, so that fluid in the opposite end of the power cylinder is exhausted. Similarly, movement of the plunger 25 to the opposite end of the valve cylinder will connect ports 21 and 22 to cause live fluid to flow to the opposite end of the cylinder, and at the same time the ports 23 will be brought into communication with the ports 31 in the plunger so that exhaust from the opposite end of the cylinder may flow into the bore of the plunger and out through the ports 30 and 24 to the exhaust outlet connection 18. The ports 30 are not essential of course if the movement of the plunger is stopped short of its contact with the end plate 32.

In Figs. 5 and 6 I have illustrated a form of the invention which enables the operator to hold the piston of the hydraulic or pneumatic power cylinder at either end of its stroke, such a valve being termed in the art a neutral action valve. It is like the form illustrated in Figs. 1 to 4 inclusive except that the metal sleeve 50 has two sets of ports 51 in communication with the annular cavity 52 into which live fluid is delivered by way of threaded openings 53, and also except that the plunger 54 has four annular ribs 55 and 55' instead of two. The plunger in this case is formed of the same type of plastic material as in the first described form of the invention. Threaded openings 56 and 57 are for connection with the two ends of a power cylinder, not shown, and they are in communication with the interior of the valve through ports 58 and 59 respectively. The bore of the plunger is an exhaust passage and is connected with the annular spaces within the sleeve 50 by means of ports 60 and 61.

In the central position of the plunger illustrated in Fig. 5 there is no flow of fluid possible either to or from the power cylinder, as will be obvious from an inspection of that figure. Hence the pressure in both ends of the power cylinder is maintained and the piston thereof is held against movement. When the plunger is moved so as to connect one set of ports 51 with the ports 59 live fluid will flow to that end of the power cylinder which is in communication with the threaded opening 57, while the other end of the power cylinder is connected with the exhaust through the ports 58 and a set of ports 62 communicating with a threaded opening 63 leading to the reservoir or to atmosphere. Shifting the plunger to the opposite end of its stroke so that the other set of ports 51 is brought into communication with ports 58 causes the piston of the power cylinder to move to the opposite end of its cylinder, as will be readily understood.

The form of the invention illustrated in Figs. 1 to 4 inclusive may be transformed into that of Figs. 5 and 6 by removing from a given body casting the lining 20 and plunger 25 and substituting the lining and plunger 50 and 54. The reverse of course is also true.

The third form of the invention is illustrated in Fig. 7. In this case the plunger 70 has two peripheral ribs 71, as in the first form, but they are spaced apart farther than those of the first form. The plunger is illustrated in its central position. Shifting the valve a very small distance therefrom in either direction will cause flow of live fluid to one or the other end of the power cylinder and flow of exhaust fluid from the opposite end of that cylinder. This valve is called a regular action valve. As shown, the metal lining 72 has one set only of ports 73 in communication with the inlet cavity 74 of the valve body, although two sets of such ports disposed as in Figs. 5 and 6 would be permissible. The lining sleeve also has ports 75 and 76 communicating with annular cavities 77 and 78 respectively which may be identical with the similar cavities in the first and second forms of the invention. A further set of ports through sleeve 72 for connection with an exhaust cavity are also provided similar to ports 24 and 62 previously described. The plunger has ports 79 and 80 therethrough for exhaust purposes, functioning like the ports 30, 31, and 60, 61, previously described. The valve of Figs. 1 to 4 inclusive may be converted into a valve like that of Fig. 7 by the substitution merely of the plunger 70 for the plunger 25.

It will be apparent therefore that with the manufacture of a relatively small number of parts three different type valves may be produced, and a wide variety of requirements may be satisfied at a minimum cost. Furthermore, the production of single piece plungers from lightweight and relatively inexpensive material, requiring no separate packings for liquid or air tight joints, is another important feature of the invention. Wear is inconsequential and there is nothing to get out of order.

Having thus described my invention, I claim:

1. In a valve of the character described, a cylinder having longitudinally spaced ports, and a plunger of plastic material slidable therein, said plunger having integral spaced resilient peripheral ribs formed in one piece with the plunger and bearing upon the cylinder walls for separating or joining certain of said ports dependent upon the selected position of the plunger, said ribs being undercut on one side to provide annular peripheral flanges, and said cylinder having intake connections adapted to expose said undercuts to fluid pressure.

2. In a valve of the character described, a cylinder having longitudinally spaced ports, a plunger of phenol-formaldehyde plastic material, said plunger being slidable in said cylinder, and said plunger having integral spaced resilient peripheral ribs formed in one piece with the plunger and bearing upon the cylinder wall for separating or joining certain of said ports dependent upon the selected position of the plunger, said ribs being undercut on one side to provide annular peripheral flanges, and said cylinder having intake connections adapted to expose said undercuts to fluid pressure.

3. In a valve of the character described, a cylinder having longitudinally spaced ports and a tubular plunger of plastic material slidable therein, said plunger having integral spaced peripheral ribs formed in one piece with the plunger and bearing resiliently upon the cylinder wall for separating or joining certain of said ports dependent upon the selected position of the plunger, said ribs being undercut on one side to provide annular peripheral flanges, and said cylinder having intake connections adapted to expose said undercuts to fluid pressure.

4. In a valve of the character described, a cylinder having longitudinally spaced ports and a tubular plunger of plastic material slidable therein, said plunger having integral spaced peripheral undercut ribs formed in one piece with the plunger and bearing resiliently upon the cylinder wall for separating or joining certain of said ports dependent upon the selected position of the plunger, and said cylinder having intake connections adapted to expose said undercuts to fluid pressure.

5. In a valve of the character described, a cylinder having longitudinally spaced live fluid ports, a tubular plunger of plastic material slidable therein, said plunger having two integral spaced peripheral ribs formed in one piece with the plunger and bearing resiliently upon the cylinder wall for separating or joining certain of said ports to interrupt or complete a passage for live fluid, said ribs being undercut on their facing sides to provide annular peripheral flanges exposed to live fluid entering the cylinder through said ports, said plunger having ports therethrough on the remote sides of said ribs, and said cylinder having an exhaust port therethrough always in communication with the bore of said tubular plunger.

DAVID Y. RICE.

REFERENCES CITED

The following references are of record in the file of this patent:

UNITED STATES PATENTS

| Number | Name | Date |
| --- | --- | --- |
| 651,334 | Baker | June 12, 1900 |
| 1,045,266 | DeVilbiss | Nov. 26, 1912 |
| 1,219,334 | Lower | Mar. 13, 1917 |
| 1,456,050 | Benbow | May 22, 1923 |
| 1,579,140 | Phillips | Mar. 30, 1926 |
| 1,925,109 | Olson | Sept. 5, 1933 |
| 2,062,994 | Higginson | Dec. 1, 1936 |
| 2,298,995 | Wilson | Oct. 13, 1942 |
| 2,309,839 | Gardner | Feb. 2, 1943 |